(12) United States Patent
Tseng

(10) Patent No.: US 10,139,010 B2
(45) Date of Patent: Nov. 27, 2018

(54) FLUID TRANSFER DEVICE BASED ON PNEUMATIC SUCKING AND EXPELLING

(71) Applicant: CHUAN JIING ENTERPRISE CO., LTD., Taichung (TW)

(72) Inventor: Tien-Tsai Tseng, Taichung (TW)

(73) Assignee: Chuan Jiing Enterprise Co., Ltd., Taichung (TW)

( * ) Notice: Subject to any disclaimer, the term of this patent is extended or adjusted under 35 U.S.C. 154(b) by 175 days.

(21) Appl. No.: 15/257,968

(22) Filed: Sep. 7, 2016

(65) Prior Publication Data

US 2018/0066766 A1    Mar. 8, 2018

(51) Int. Cl.
*F04F 1/02* (2006.01)
*F04F 3/00* (2006.01)
*F04F 5/14* (2006.01)
*F04F 5/20* (2006.01)
*F04F 5/52* (2006.01)
*F16K 35/02* (2006.01)
*F16K 31/60* (2006.01)

(52) U.S. Cl.
CPC .............. *F16K 35/027* (2013.01); *F04F 1/02* (2013.01); *F04F 3/00* (2013.01); *F04F 5/14* (2013.01); *F04F 5/20* (2013.01); *F04F 5/52* (2013.01); *F16K 31/602* (2013.01)

(58) Field of Classification Search
CPC ...... F16K 35/00; F16K 35/027; F16K 31/602; F04B 9/14; F04B 33/00; F04F 1/02; F04F 1/06; F04F 3/00; F04F 5/14; F04F 5/20; F04F 5/52

USPC ........ 251/89.5, 95, 98, 99, 100; 70/175, 179
See application file for complete search history.

(56) References Cited

U.S. PATENT DOCUMENTS

| | | | |
|---|---|---|---|
| 2,141,427 A * | 12/1938 | Bryant | F04F 1/02 417/120 |
| 2,855,946 A * | 10/1958 | Mackal | B63C 9/24 137/223 |
| 3,320,970 A * | 5/1967 | McHenry | F04F 1/02 137/403 |
| 4,964,784 A * | 10/1990 | Vanderheyden | B67D 7/0272 222/17 |
| 5,007,803 A * | 4/1991 | DiVito | F04F 1/02 417/137 |
| 5,425,333 A * | 6/1995 | Baylor | F01P 11/06 123/41.14 |
| 5,433,410 A * | 7/1995 | Foltz | F01M 11/0408 251/100 |
| 5,478,049 A * | 12/1995 | Lescoe | F01M 11/0408 251/100 |
| 5,938,408 A * | 8/1999 | Krichbaum | F04F 5/52 417/127 |
| 2003/0049137 A1* | 3/2003 | Broerman | F04F 1/02 417/182.5 |

(Continued)

Primary Examiner — Mary McManmon
Assistant Examiner — Jonathan Waddy
(74) Attorney, Agent, or Firm — Alan D. Kamrath; Kamrath IP Lawfirm, P.A.

(57) ABSTRACT

A fluid transfer device includes a high-pressure pipe and a control unit. The high-pressure pipe is based on a Venturi tube, and includes an inlet at an end and an outlet at another end. The high-pressure pipe is connected to a container via a negative-pressure pipe and a positive-pressure pipe. The inlet is connected to a pressurized air source. The control unit is used to control opening and closing of the outlet.

15 Claims, 5 Drawing Sheets

(56) References Cited

U.S. PATENT DOCUMENTS

2003/0223881 A1\* 12/2003 Tseng ................ F04B 33/00
                                                    417/199.1
2007/0048149 A1\*  3/2007 Chang ................ F04B 33/00
                                                    417/374

\* cited by examiner

US 10,139,010 B2

FLUID TRANSFER DEVICE BASED ON PNEUMATIC SUCKING AND EXPELLING

BACKGROUND OF INVENTION

1. Field of Invention

The present invention relates to a fluid transfer device based on a Venturi tube and, more particularly, to opening and closing of an outlet of a fluid transfer device based on a Venturi tube.

2. Related Prior Art

A Venturi tube is a tube made with a variant internal diameter. In specific, the Venturi tube includes a neck between an inlet and an outlet. The internal diameter is smaller at the neck than at the remaining portions. When pressurized air travels in the Venturi tube, and since the internal diameter of the Venturi tube changes, the velocity of the air changes, and so does the pressure of the air in the Venturi tube. When the outlet is opened, fluid is sucked into the Venturi tube from a closed space that is in communication with the interior of the Venturi tube at the neck. When the outlet is closed, the pressurized fluid enters the closed space from the Venturi tube via the neck. Thus, the transfer of the fluid in the closed space is under control.

The present invention is therefore intended to obviate or at least alleviate the problems encountered in the prior art.

SUMMARY OF INVENTION

It is the primary objective of the present invention to provide a reliable fluid transfer device.

To achieve the foregoing objective, the fluid transfer device includes a high-pressure pipe and a control unit. The high-pressure pipe includes a Venturi tube, and includes an inlet at an end and an outlet at another end. The high-pressure pipe is connected to a container via a negative-pressure pipe and a positive-pressure pipe. The inlet is connected to a pressurized air source. The control unit includes a joint, a switch and a lock unit. The joint is connected to the outlet and made with a space. The switch includes a plunger, an enlarged section and a confining unit. The plunger extends in the space and includes a channel and at least one vent. The channel is axially made therein and in communication with the space. The vent is made in a periphery of the plunger and in communication with the channel. The switch is movable relative to the joint between a closing position and an opening position. The vent is completely in the joint, and the outlet is closed when the switch is in the closing position. The vent is in communication with exterior of the joint, and the outlet is opened when the switch is in the opening position. The enlarged section is formed at an end of the plunger and is located out of the joint. The confining unit keeps the switch on the joint when the switch is in the opening position. The lock unit includes a locking element, at least one locking portion and at least one unlocking portion. The locking element is formed on the enlarged section. The locking portion is formed on the joint and adapted for receiving the locking element. The locking portion provides an arcuate path for rotation of the locking element about an axis of the joint, and includes an axial stop for abutting against and keeping the locking element therein. The unlocking portion is formed on the joint, connected to the locking portion, and adapted for receiving the locking element. The unlocking portion provides a rectilinear path for translation of the locking element along the axis.

Advantageously, the control unit closes or opens the outlet of the high-pressure pipe. When the outlet is closed, pressurized air enters the Venturi tube via the inlet, and then enters the container via the positive-pressure pipe, thereby pressurizing the container and expelling fluid from the container.

When the outlet is opened, pressurized air travels throughout the neck, reducing the pressure to suck air to the high-pressure pipe from the container via the negative-pressure pipe. Then, the pressurized air leaves via the outlet.

The switch is turned between a closing position and an opening position. The lock unit is operable to hold the switch in the closing position. In the closing position, the switch keeps the outlet perfectly air-tight.

Other objectives, advantages and features of the present invention will be apparent from the following description referring to the attached drawings.

BRIEF DESCRIPTION OF DRAWINGS

The present invention will be described via detailed illustration of the preferred embodiments referring to the drawings wherein.

DETAILED DESCRIPTION OF PREFERRED EMBODIMENTS

Figure 1:
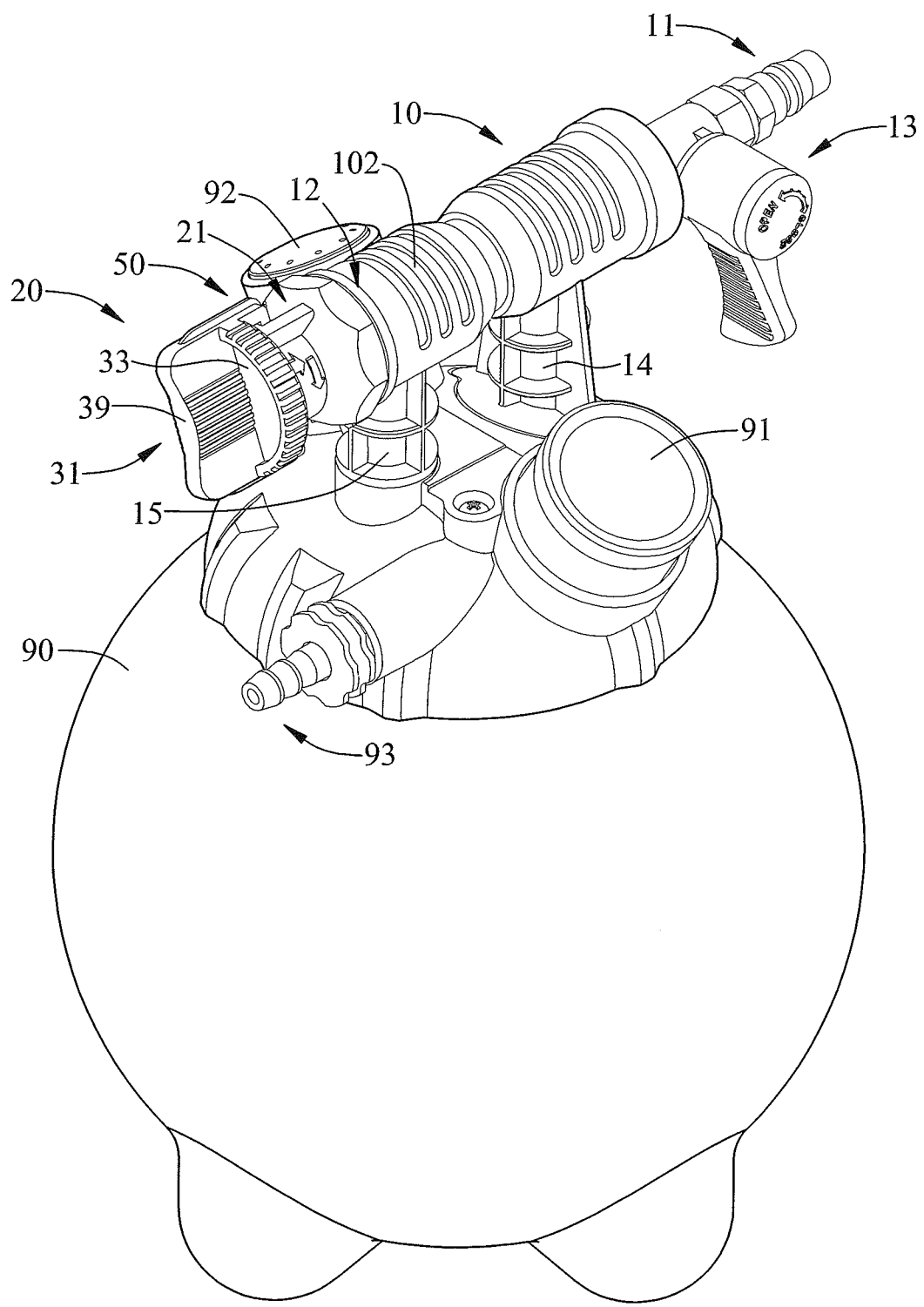
FIG. 1 is a perspective view of a fluid transfer device according to the preferred embodiment of the present invention.
Figure 3:
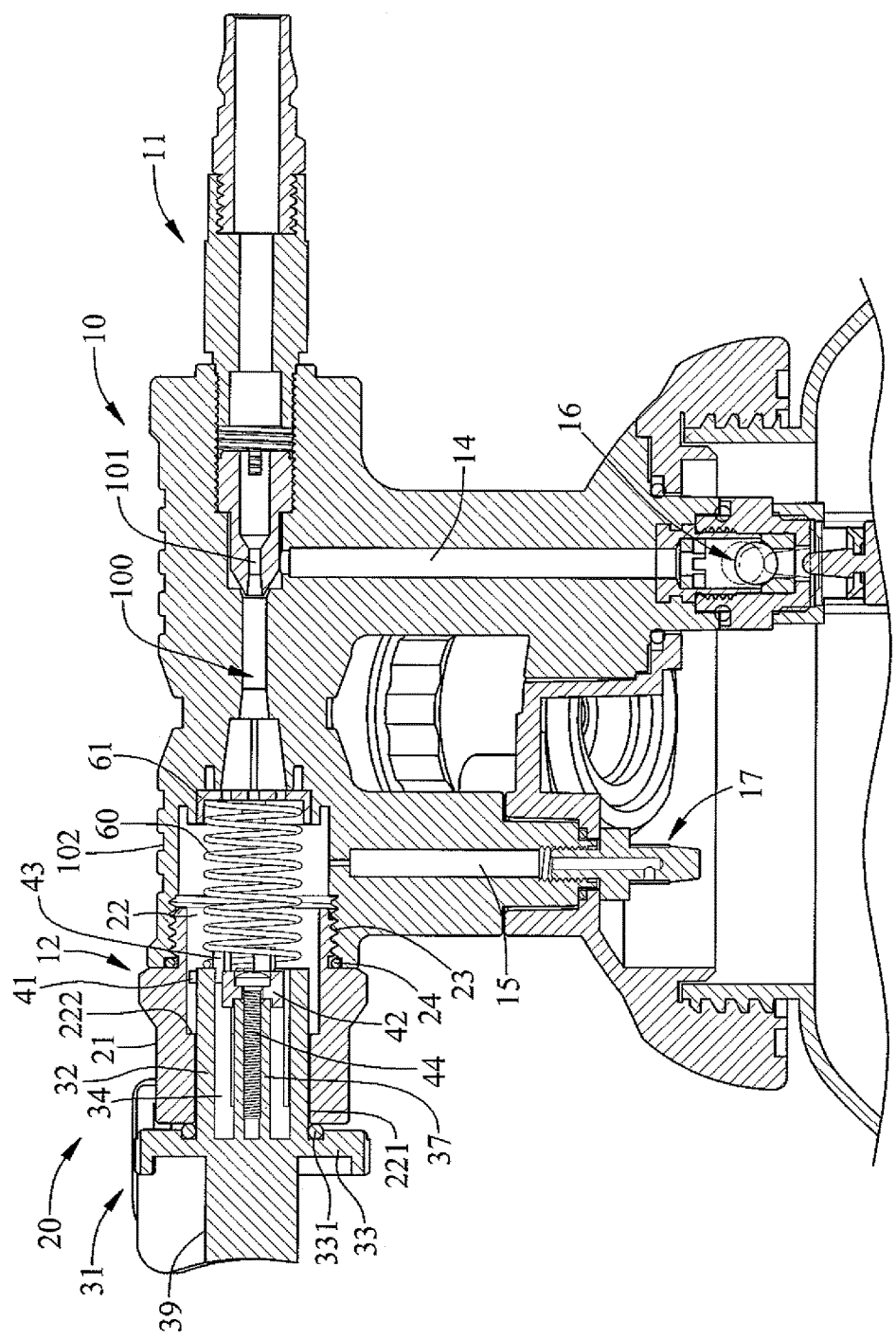
FIG. 3 is a cross-sectional view of the fluid transfer device shown in FIG. 1, showing an outlet closed.

Referring to FIGS. 1 and 3, a fluid transfer device includes a high-pressure pipe 10 and a control unit 20 according to the preferred embodiment of the present invention. The control unit 20 includes a switch 31, a stop 40 and a lock unit 50.

The high-pressure pipe 10 includes a Venturi tube 100 that includes a neck 101 between a terminal section 102 and another terminal section (not numbered). The high-pressure pipe 10 includes an inlet 11 at an end and an outlet 12 at another end. The inlet 11 is connected to a pressurized air source (not shown). The opening and closing of the inlet 11 is under the control of a switch 13. The opening and closing of the outlet 12 is under the control of the control unit 20. The neck 101 is connected to a negative-pressure pipe 14. The terminal section 102 is connected to a positive-pressure pipe 15.

A container 90 is connected to the negative-pressure pipe 14 and the positive-pressure pipe 15. The container 90 is equipped with a pressure gauge 91, a pressure-relief valve 92 and a filling pipe 93. The negative-pressure pipe 14 is equipped with a check valve 16 to allow fluid to flow to the high-pressure pipe 10 from the container 90 but prevent travel of the fluid in an opposite direction. The positive-pressure pipe 15 is equipped with a check valve 17 to allow fluid to flow to the container 90 from the high-pressure pipe 10 and prevent travel of the fluid in an opposite direction.

Figure 2:
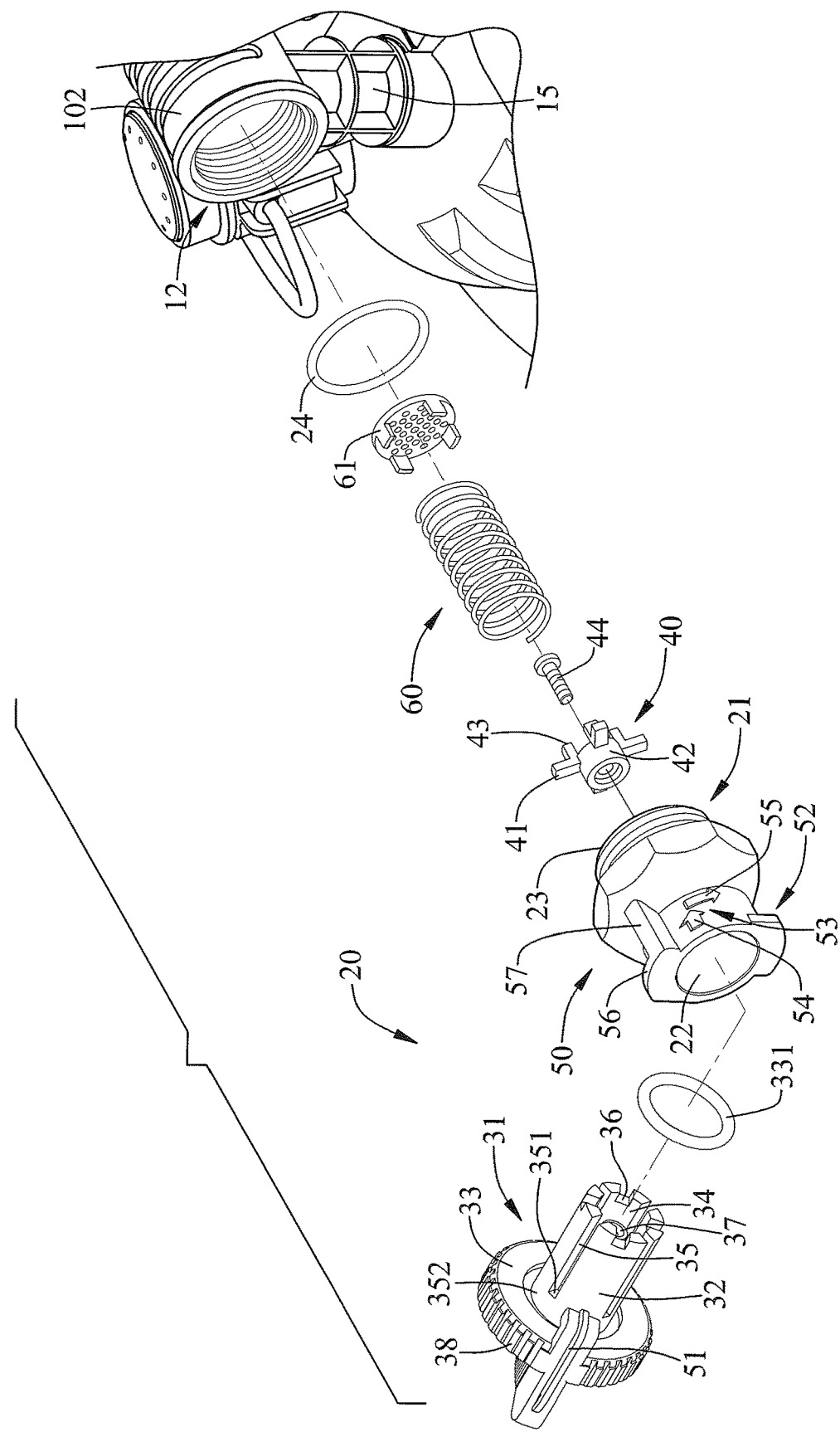
FIG. 2 is an exploded view of the fluid transfer device of FIG. 1.
Figure 4:
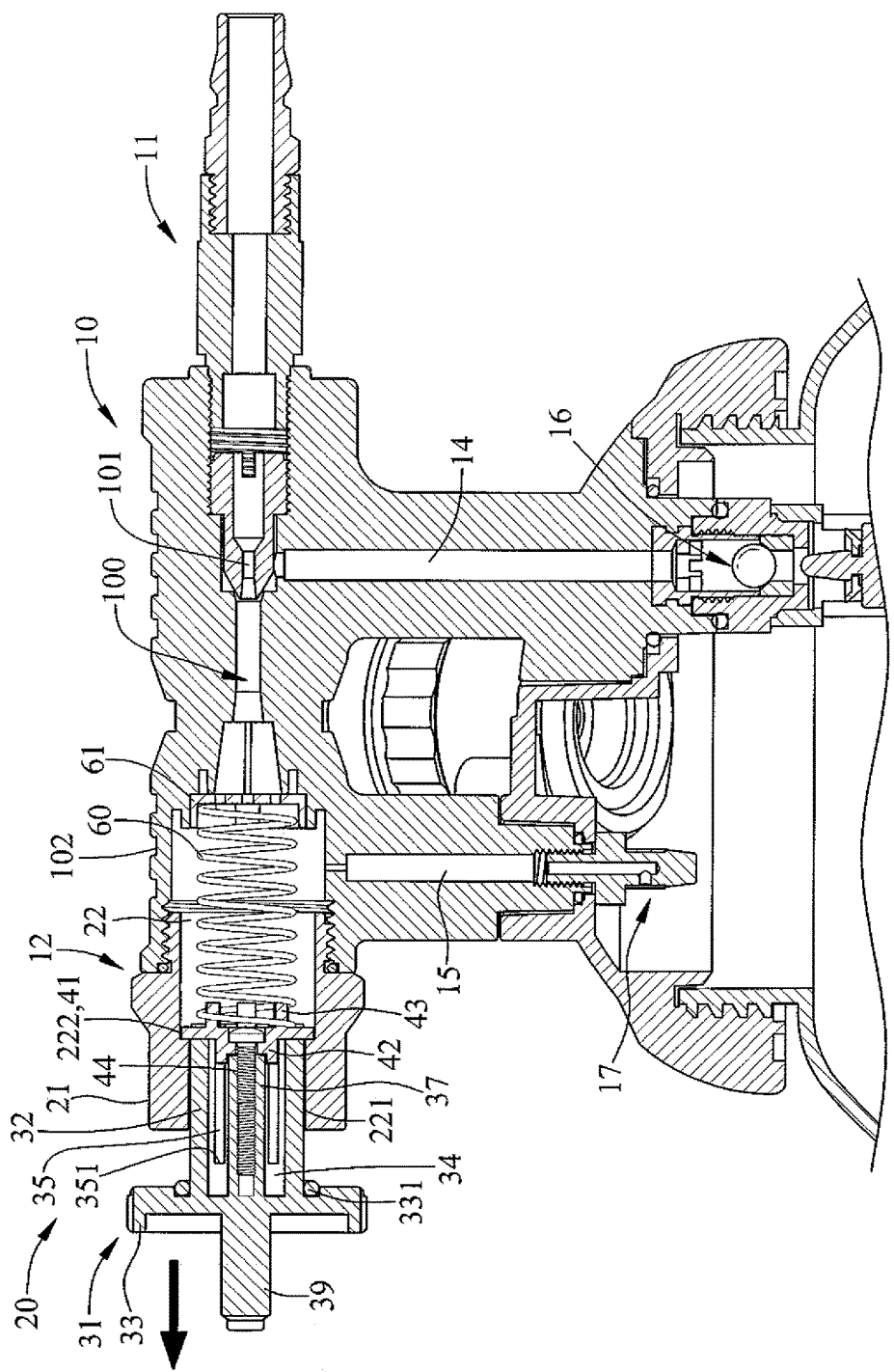
FIG. 4 is a cross-sectional view of the fluid transfer device shown in FIG. 1, showing the outlet opened.

Referring to FIGS. 2 and 4, the control unit 20 includes a joint 21 connected to the outlet 12 of the high-pressure pipe 10 via a thread 23 and a sealing element 24. A space 22 extends through the joint 21. The switch 31 includes an enlarged section 33 formed at an end of a plunger 32. The plunger 32 is movable to and fro in the space 22 of the joint 21. The enlarged section 33 is located on an external face of the joint 21. A washer 331 is provided on a side of the enlarged section 33 that faces the joint 21. The plunger 32 axially includes a channel 34 in communication with the space 22. The plunger 32 includes, on the periphery, vents 35 in communication with the channel 34. There is a distance 352 between an end 351 of each of the vents 35 and the enlarged section 33.

Referring to FIG. 3, the switch 31 is in a closing position and closes the outlet 12 of the high-pressure pipe 10. The plunger 32 is inserted in the space 22. The enlarged section 33 presses the washer 331 against an end of the joint 21 as the vents 35 are completely inserted in the space 22 and closed by a wall 221 of the space 22. Pressurized air travels to the Venturi tube 100 via the inlet 11, but cannot leave the Venturi tube 100 via the outlet 12. Hence, the pressurized air enters the container 90 via the positive-pressure pipe 15 and squeezes the fluid out of the container 90 via the filling pipe 93.

Referring to FIG. 4, the switch 31 is in an opening position to open the outlet 12 of the high-pressure pipe 10. Now, the plunger 32 is partially located out of the space 22 so that the vents 35 are in communication with the exterior of the joint 21. Via the inlet 11, the pressurized air enters the Venturi tube 100, the space 22 of the joint 21 and the channel 34 of the plunger 32, and finally leaves via the vents 35. While traveling via the neck 101 of the Venturi tube 100, the pressurized air reduces the pressure to suck air into the high-pressure pipe 10 from the container 90 via the negative-pressure pipe 14. The air leaves the high-pressure pipe 10 via the vents 35 of the plunger 32 with the pressurized air. The reciprocation of the switch 31 as shown in FIGS. 3 and 4 can be done manually for example.

Referring to FIGS. 2 through 4, to keep the switch 31 on the joint 21, there is a confining unit between the switch 31 and the joint 21. As the switch 31 is in the opening position, the confining unit keeps the switch 31 on the joint 21. The confining unit includes a shoulder 222 formed on the wall 221 of the space 22 and two protrusions 41 formed on the stop 40 attached to the plunger 32. As the switch 31 is moved toward the exterior of the joint 21 so that the vents 35 are in communication with the exterior of the joint 21, the protrusions 41 are abutted against the shoulder 222 so that the switch 31 is kept on the joint 21. The stop 40 further includes a ring 42 and inserts 43. The protrusions 41 extend on an external face of the ring 42. The inserts 43 longitudinally extend from an end face of the ring 42. The plunger 32 includes cutouts 36 for receiving the protrusions 41. The ring 42 is connected to an axial sleeve 37 of the plunger 32 via a fastener 44, with the protrusions 41 extending through the cutouts 36 of the plunger 32. The protrusions 41 and inserts 43 of the stop 40 do not close the channel 34 of the plunger 32. That is, the channel 34 remains in communication with the space 22 of the joint 21.

Referring to FIG. 3, the switch 31 is in the closing position to close the high-pressure pipe 10. It is preferable to use the lock unit 50 to lock the switch 31 so that the switch 31 cannot be turned to the opening position by the pressurized air.

Figures 5, 6:
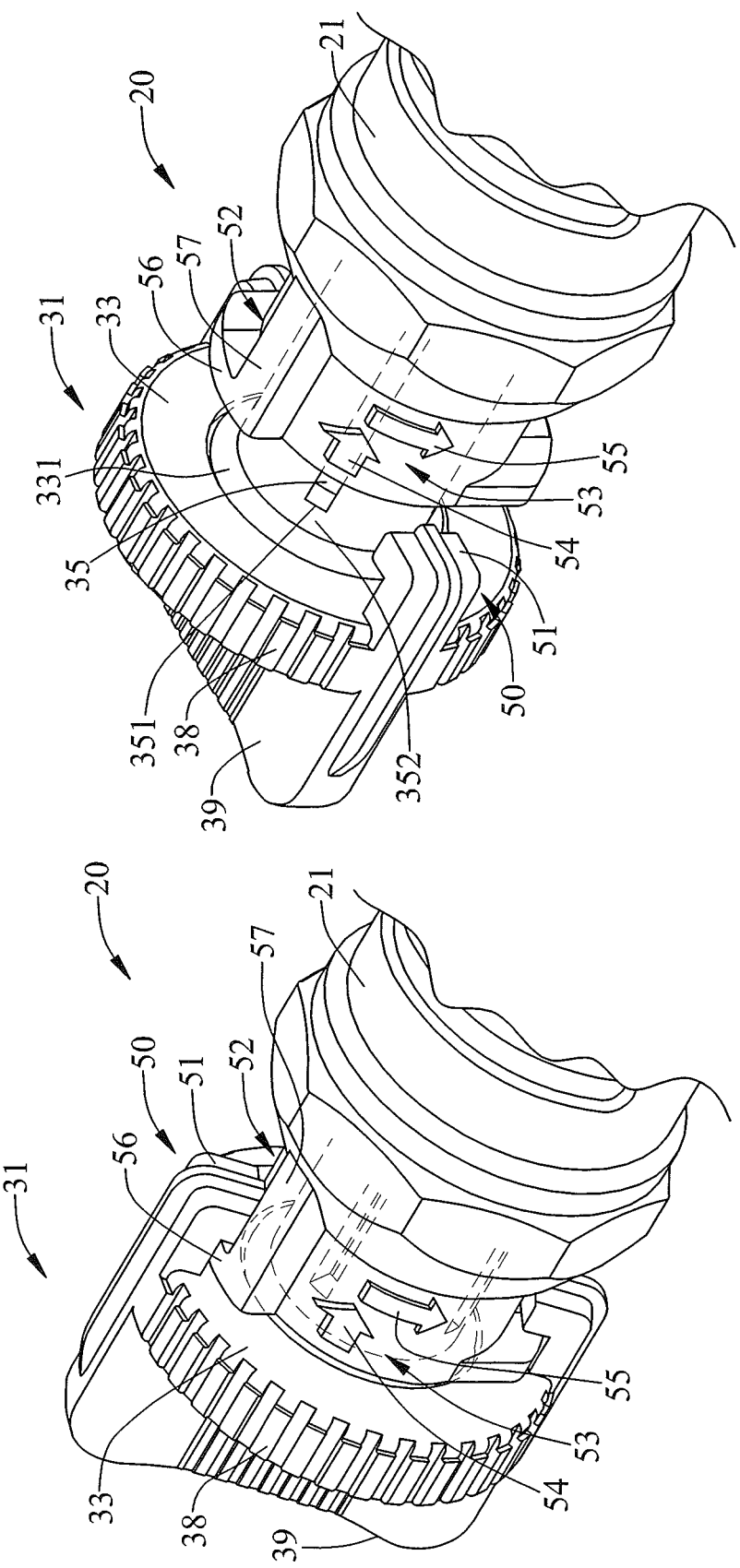
FIG. 5 is a perspective view of the fluid transfer device of FIG. 3.
FIG. 6 is a perspective view of the fluid transfer device of FIG. 4.

Referring to FIGS. 2, 5 and 6, the lock unit 50 includes a locking element 51, a locking portion 52 and an unlocking portion 53. The locking element 51 extends on the enlarged section 33 of the switch 31. The locking portion 52 and the unlocking portion 53 are provided on the joint 21. The locking portion 52 receives the locking element 51. The unlocking portion 53 provides a rectilinear path for translation of the locking element 51 to and fro along an axis of the joint 21. The locking portion 52 is connected to the unlocking portion 53 to provide an arcuate path for rotation of the locking element 51 to and fro about the axis of the joint 21. The locking portion 52 includes an axial stop 56 connected to a circumferential stop 57. The axial stop 56 stops the locking element 51 in the locking portion 52 to prevent the locking element 51 from leaving the locking portion 52 along the axis of the joint 21. The circumferential stop 57 limits the angle of the rotation of the locking element 51 into the locking portion 52 from the unlocking portion 53.

Referring to FIGS. 3 and 5, the locking operation of the lock unit 50 will be described. Two arrow heads 54 and 55 are marked on an external face of the joint 21. At first, as indicated by the arrow head 54, the locking element 51 of the switch 31 is moved toward the joint 21 along the unlocking portion 53 so that the washer 331 of the enlarged section 33 closes an end of the joint 21. Then, as indicated by the arrow head 55, the switch 31 is rotated so that the locking element 51 is rotated to the locking portion 52 from the unlocking portion 53. The axial stop 56 abuts against the locking element 51 so that the switch 31 is locked, thereby keeping the outlet 12 of the high-pressure pipe 10 closed. Attention should be paid to the distance 352 mentioned referring to FIG. 2. The distance 352 reduces impacts that the pressurized air exerts on the washer 331, because the distance 352 allows the vents 35 to be completely withdrawn into the space 22 and closed by the wall 221, which protects the washer 331 from the pressurized air that rushes via the vents 35. The life of the washer 331 is increased for not taking impacts from the pressurized air.

Referring to FIGS. 4 and 6, the unlocking operation of the lock unit 50 will be described. The unlocking operation is executed to rotate the locking element 51 to the unlocking portion 53 from the locking portion 52, opposite to what is shown in FIGS. 3 and 5. Thus, the lock unit 50 allows the switch 31 to move freely along the axis of the joint 21 and opens the outlet 12 of the high-pressure pipe 10. To facilitate the manual operation of the switch 31, the enlarged section 33 is provided with a skid-proof annular face 38 and a handle 39 extending from an end face of the enlarged section 33.

Referring to FIGS. 2 to 4, a spring 60 is arranged between the switch 31 and the terminal section 102 of the high-pressure pipe 10. An end of the spring 60 is abutted against a positioning element 61 that is in contact with an internal face of the terminal section 102 of the high-pressure pipe 10. Another end of the spring 60 is provided around the inserts 43 of the stop 40 and abutted against the protrusions 41.

Referring to FIG. 3, the switch 31 closes the outlet 12 of the high-pressure pipe 10. Now, the switch 31 compresses and loads the spring 60.

Referring to FIG. 4, the switch 31 opens the outlet 12 of the high-pressure pipe 10, the spring 60 moves the switch 31 outward, and the spring 60 keeps the switch 31 in position due to the elasticity thereof.

The present invention has been described via the detailed illustration of the preferred embodiments. Those skilled in the art can derive variations from the preferred embodiments without departing from the scope of the present invention.

Therefore, the preferred embodiments shall not limit the scope of the present invention defined in the claims.

The invention claimed is:

1. A fluid transfer device comprising a high-pressure pipe and a control unit, wherein the high-pressure pipe comprises a Venturi tube made with an inlet at an end and an outlet at another end, and connected to a container via a negative-pressure pipe and a positive-pressure pipe, wherein the inlet is connected to a pressurized air source, and wherein the control unit comprises:
   a joint connected to the outlet and made with a space;
   a switch movable relative to the joint between a closing position and an opening position, with the switch comprising:
      a plunger extending in the space and comprising:
         a channel axially made therein and in communication with the space; and
         at least one vent in a periphery of the plunger and in communication with the channel, wherein the at least one vent is completely in the joint and the outlet is closed when the switch is in the closing position, and wherein the at least one vent is in communication with an exterior of the joint and the outlet is opened when the switch is in the opening position;
      an enlarged section formed at an end of the plunger and located out of the joint; and
   a confining unit for keeping the switch on the joint when the switch is in the opening position, wherein the confining unit comprises a shoulder on a wall of the space and a stop connected to the plunger, and wherein the shoulder abuts against the stop when the switch is in the opening position; and
   a lock unit comprising:
      a locking element formed on the enlarged section;
      at least one locking portion formed on the joint and adapted for receiving the locking element, wherein the at least one locking portion provides an arcuate path for rotation of the locking element about an axis of the joint, and wherein the at least one locking portion comprises an axial stop for abutting against and keeping the locking element therein; and
      at least one unlocking portion formed on the joint, connected to the at least one locking portion and adapted for receiving the locking element, wherein the at least one unlocking portion provides a rectilinear path for translation of the locking element along the axis.

2. The fluid transfer device according to claim 1, wherein the stop comprises a protrusion for abutment against the shoulder.

3. The fluid transfer device according to claim 2, wherein the stop comprises a ring from which the protrusion extends.

4. The fluid transfer device according to claim 3, wherein the plunger comprises an axial sleeve connected to the ring.

5. The fluid transfer device according to claim 4, comprising a fastener for connecting the ring to the axial sleeve.

6. The fluid transfer device according to claim 2, wherein the plunger comprises at least one cutout for receiving the protrusion.

7. The fluid transfer device according to claim 6, wherein the protrusion extends beyond an external face of the plunger.

8. The fluid transfer device according to claim 3, further comprising:
   a positioning element resting on an internal face of a terminal section of the high-pressure pipe corresponding to the outlet; and
   a spring comprising a first end in contact with the positioning element and a second end in contact with the protrusion.

9. The fluid transfer device according to claim 8, wherein the stop comprises at least one insert inserted in the second end of the spring.

10. The fluid transfer device according to claim 1, further comprising a spring inserted in a terminal section of the high-pressure pipe corresponding to the outlet, wherein an end of the spring is abutted against the plunger.

11. The fluid transfer device according to claim 1, wherein the at least one locking portion comprises a circumferential stop connected to the axial stop, and wherein the circumferential stop limits an angle of rotation of the at least one locking element into the locking portion from the at least one unlocking portion.

12. The fluid transfer device according to claim 1, wherein the switch comprises a skid-proof annular face on periphery of the enlarged section.

13. The fluid transfer device according to claim 1, wherein the switch comprises a handle at an end of the switch opposite to the joint.

14. A fluid transfer device comprising a high-pressure pipe and a control unit, wherein the high-pressure pipe comprises a Venturi tube made with an inlet at an end and an outlet at another end, and connected to a container via a negative-pressure pipe and a positive-pressure pipe, wherein the inlet is connected to a pressurized air source, and wherein the control unit comprises:
   a joint connected to the outlet and made with a space;
   a switch movable relative to the joint between a closing position and an opening position, with the switch comprising:
      a plunger extending in the space and comprising:
         a channel axially made therein and in communication with the space; and
         at least one vent in a periphery of the plunger and in communication with the channel, wherein the at least one vent is completely in the joint and the outlet is closed when the switch is in the closing position, and wherein the at least one vent is in communication with an exterior of the joint and the outlet is opened when the switch is in the opening position;
      an enlarged section formed at an end of the plunger and located out of the joint;
   a confining unit for keeping the switch on the joint when the switch is in the opening position; and
   a washer provided on the enlarged section, and abutting against the joint when the switch is in the closing position; and
   a lock unit comprising:
      a locking element formed on the enlarged section;
      at least one locking portion formed on the joint and adapted for receiving the locking element, wherein the at least one locking portion provides an arcuate path for rotation of the locking element about an axis of the joint, and wherein the at least one locking portion comprises an axial stop for abutting against and keeping the locking element therein; and
      at least one unlocking portion formed on the joint, connected to the at least one locking portion and adapted for receiving the locking element, wherein the at least one unlocking portion provides a rectilinear path for translation of the locking element along the axis.

15. The fluid transfer device according to claim 14, wherein the washer is at a distance from an end of the vent.

* * * * *